United States Patent [19]

Yaguchi et al.

[11] Patent Number: 4,903,817

[45] Date of Patent: Feb. 27, 1990

[54] APPARATUS FOR TRANSPORTING LITHOGRAPHIC PLATES

[75] Inventors: Akio Yaguchi, Hidaka; Takatsugu Kyoo, Iruma, both of Japan

[73] Assignee: Tsubakimoto Chain Co., Japan

[21] Appl. No.: 179,422

[22] Filed: Apr. 8, 1988

[51] Int. Cl.[4] .............................................. B65G 47/24

[52] U.S. Cl. ................................ 198/406; 198/470.1; 198/484.1

[58] Field of Search ............. 198/470.1, 484.1, 803.13, 198/406, 407; 101/232; 271/204

[56] References Cited

U.S. PATENT DOCUMENTS

| | | | |
|---|---|---|---|
| 1,271,906 | 7/1918 | Juengst | 198/470.1 |
| 1,828,516 | 10/1931 | Wagner et al. | 198/484.1 |
| 2,707,548 | 5/1955 | Furst | 198/420.1 |
| 2,813,615 | 11/1957 | Klein | 198/406 |
| 3,412,841 | 11/1968 | Couch et al. | 198/470.1 |

*Primary Examiner*—Joseph E. Valenza
*Attorney, Agent, or Firm*—Steele, Gould & Fried

[57] ABSTRACT

Lithographic plates (S) are transported from an input chute (2) onto which they are released from an overhead conveyor (1) to an outlet (20) at a lower level by a rotary shelf device (10) in which a series of plate trays (16) travel with endless chains (13, 13'). The lithographic plates are fed onto successive plate trays (16) by a belt conveyor (4) onto which the plates are directed from the chute (2). The plate trays (16) are upwardly inclined away from the chains (13, 13') during the downward movement of the trays from a position adjacent the belt conveyor (4) to the outlet (20).

2 Claims, 9 Drawing Sheets

APPARATUS FOR TRANSPORTING LITHOGRAPHIC PLATES

BACKGROUND OF THE INVENTION

1. Field of the Invention

This invention relates to apparatus for transporting lithographic plates used for printing newspapers or the like and, in particular, to apparatus for transporting such lithographic plates from a first location at which the plates are delivered by an overhead conveyor to a second location at a lower level.

2. Prior Art

A lithiographic plate of the kind used for printing newspapers or the like takes the form of an aluminium sheet having a thickness of the order of 0.3 mm and having one or both end regions thereof folded over to lie at approximately 30° to the plane of the sheet. To transport the plate from one process station to another within the printing works, the plates are carried by an overhead conveyor which engages the folded end region of the plate.

The overhead conveyor normally travels close to a ceiling of the printing works and the conveyed lithographic plates must be successively fed downwardly towards a rotary press provided below the overhead conveyor. In addition, the lithographic plates must be temporarily stored during the downward movement.

The high speeds demanded in printing newspapers mean that the lithographic plate is normally of a size corresponding to two pages of a newspaper. Difficulties arise when attempting to move and store lithographic plates of this size, since the plates are not rigid.

SUMMARY OF THE INVENTION

The present invention aims to provide apparatus which enables lithographic plates to be conveniently and reliably transferred from an overhead conveyor and presented at a process station at a lower level.

Accordingly, the invention provides apparatus for transporting lithographic plates from a first location at which the plates are delivered by an overhead conveyor to a second location at a lower level, comprising storage means for receiving the lithographic plates at the first location and delivering them in succession to the second location, characterised in that the storage means comprises a rotary shelf conveyor in which a series of plate trays are moved around an endless path and the plate trays are upwardly inclined during movement along a portion of the path extending between the first and second locations.

BRIEF DESCRIPTION OF THE DRAWINGS

In order that the invention may be more readily understood, an embodiment thereof will now be described, by way of example, with reference to the accompanying drawings, in which.

DETAILED DESCRIPTION OF THE PREFERRED EMBODIMENTS

Figure 6:
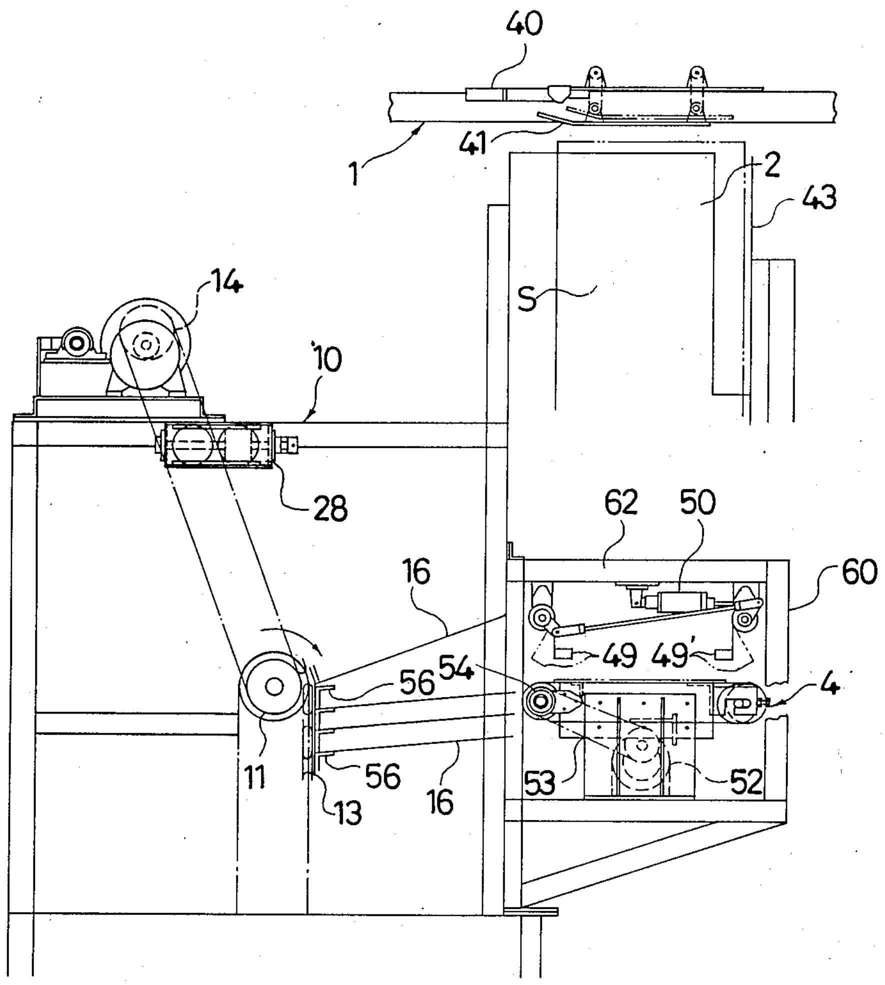
FIG. 6 is an enlarged view of an upper portion of the FIG. 1 apparatus.
Figure 7:
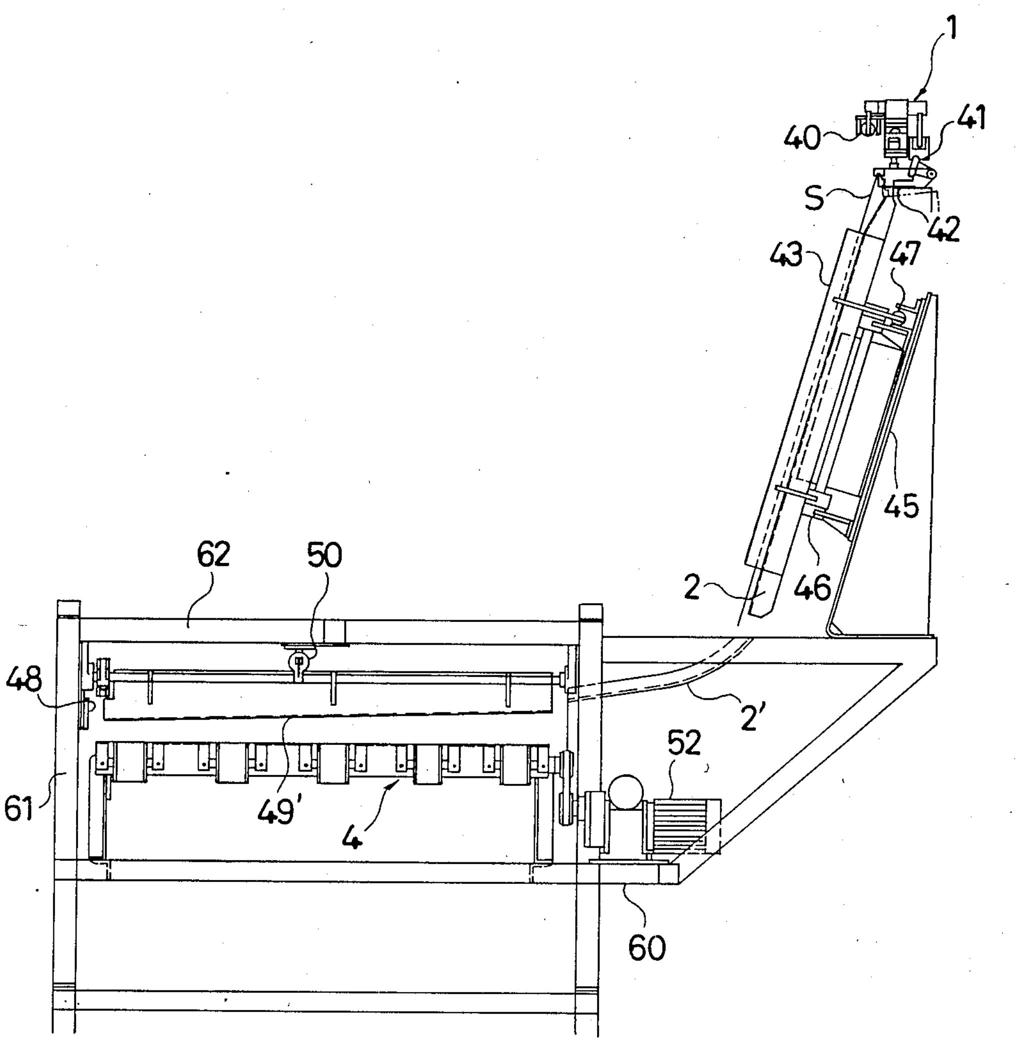
FIG. 7 is a side view of the upper portion of the apparatus shown in FIG. 6.
Figure 8:
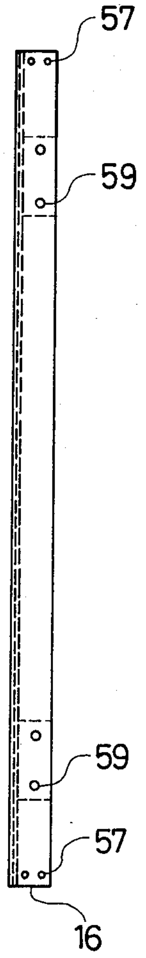
FIG. 8 is a side view of a lithographic plate tray employed in the FIG. 1 apparatus.
Figure 9:
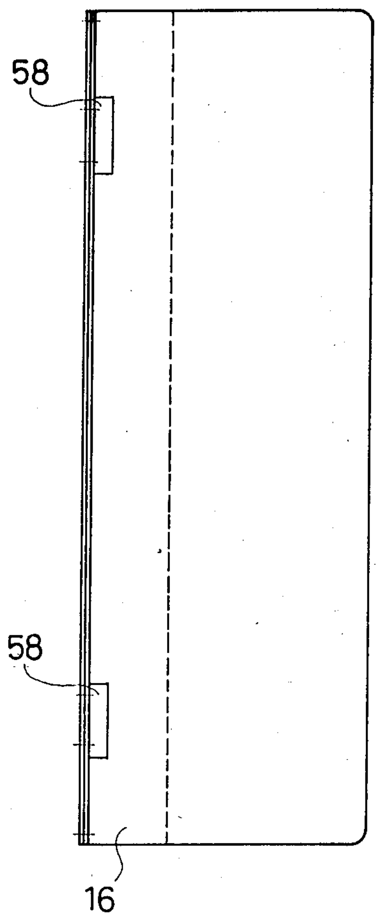
FIG. 9 is a plan view of the lithographic plate tray of FIG. 8.
Figure 10:
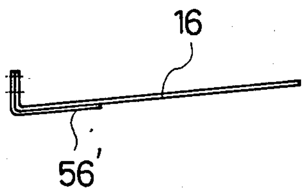
FIG. 10 is an end view of the lithographic plate tray.
Figure 11:
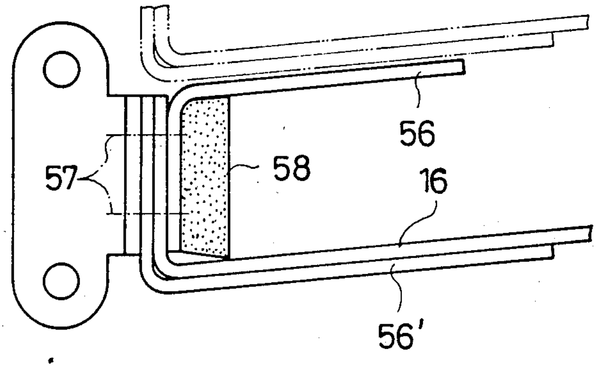
FIG. 11 is a fragmentary end view of the plate tray on an enlarged scale.
Figure 12:
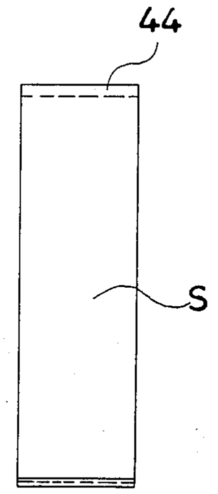
FIG. 12 is a front view of a lithographic plate with which the apparatus embodying the invention is intended to be used.
Figure 13:
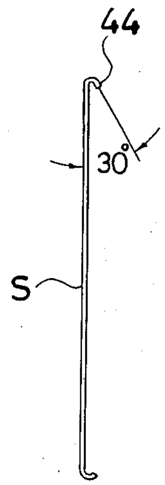
FIG. 13 is a side view of the lithographic plate.

Referring now to the drawings, apparatus for transporting lithographic plates S in a printing works comprises an overhead conveyor 1 positioned in close proximity to a ceiling of the works. As shown in FIGS. 12 and 13, the lithographic plate S has an end portion 44 thereof turned over to lie at an angle of approximately 30° to the plane of the plate and, as shown in FIGS. 6 and 7, the overhead conveyor 1 comprises clips 42 for gripping the turned over end portion 44 of a lithographic plate. A clip cam 41 actuated by a cylinder 40 is provided to open a clip arriving at a first delivery location to release a lithographic plate carried by the clip.

Positioned immediately below the overhead conveyor at the delivery location is an upper input chute 2 having a plate stop 43 along one edge thereof. As shown in FIG. 7, the chute 2 is mounted in an inclined position on a support bed 45 by holding means 46 and the stop 43 is movable by means of a cylinder 47 from a normal retracted position in which it does not project from the surface of the chute to the extended operative position shown in FIG. 7.

A lower chute 2' is disposed below the upper chute 2 and leads to a transfer conveyor in the form of a belt conveyor 4 driven by a drive motor 52 through a chain 53 and a sprocket 54 (FIG. 6).

As shown in FIGS. 6 and 7, the belt conveyor 4 is accommodated within a housing 60 and a pair of lithographic plate retainers 49 and 49' are mounted within the housing above the belt conveyor 4. The retainers are in the form of L shaped members adapted to retain therebetween a lithographic plate fed into the housing 60 by the chute 2'. The retainers 49 and 49' are movable between a closed position shown in full lines in FIG. 6 and an open position shown in dashed lines in FIG. 6 by means of a piston and cylinder device 50 mounted on a top wall 62 of the housing 60. The retainers 49 and 49' slope downwardly from the bottom end of the chute 2' towards a wall 61 of the housing 60 which carries a resilient stop 48.

The housing 60 containing the belt conveyor and the plate retainers is formed adjacent an upper portion of an elongate main housing 65 (FIG. 1) of a rotary shelf device 10 extending upwardly from a lower floor 5 of the building through an upper floor 3.

Figure 1:
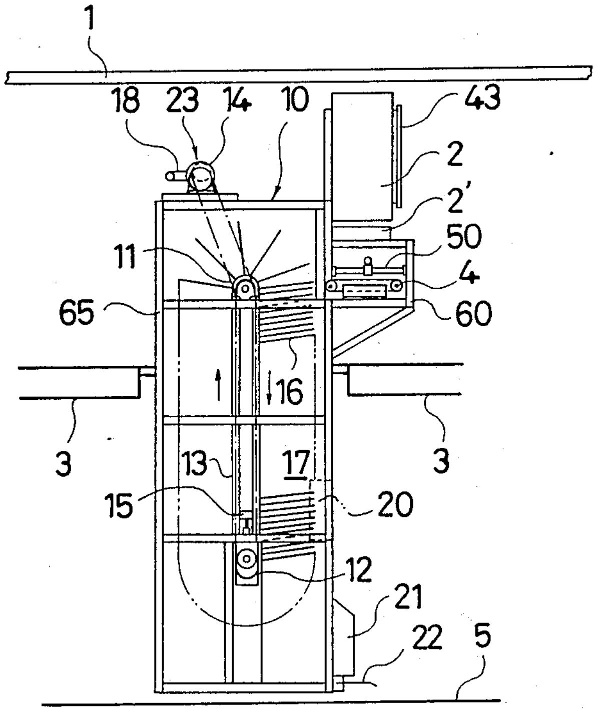
FIG. 1 is a schematic front view of apparatus embodying the present invention.
Figure 2:
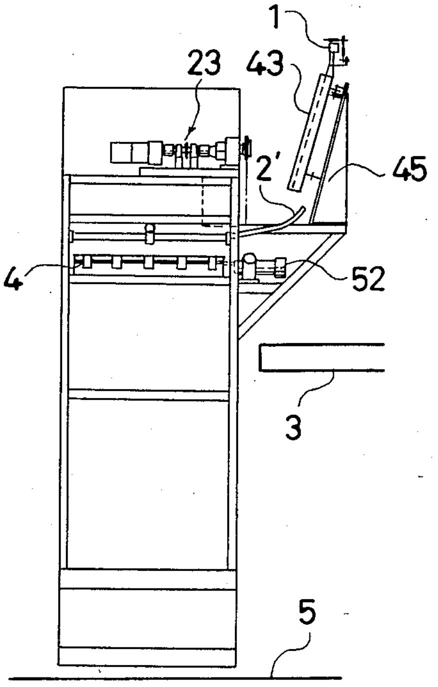
FIG. 2 is a side view of the apparatus shown in FIG. 1.
Figure 4:
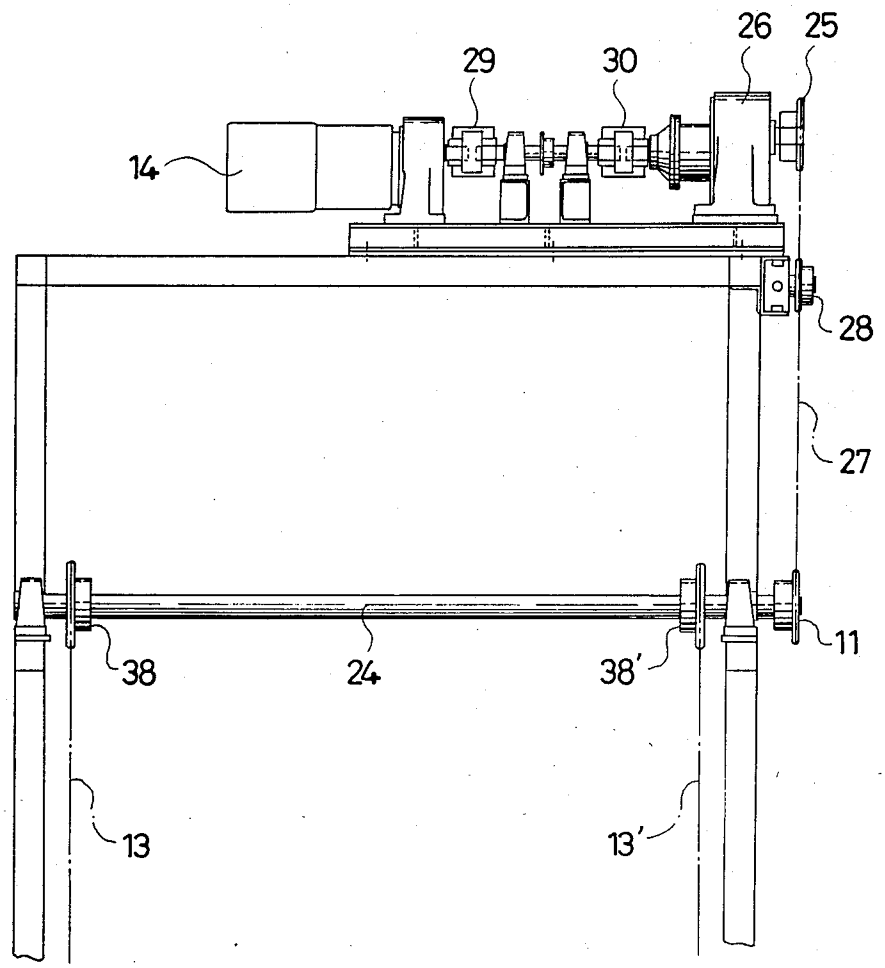
FIG. 4 is an enlarged side view of a drive arrangement of the FIG. 1 apparatus.

As shown in FIGS. 1 and 4, the rotary shelf device comprises a pair of endless chains 13, 13' extending around respective upper driven sprockets 38, 38' carried by a main shaft 24 and respective lower idler sprockets 12 provided with a take-up device 15 to accommodate any slackness resulting from expansion of the chains.

The main shaft 24 is rotated to drive the chains in the direction indicated by arrows in FIGS. 1 and 6 by a drive sprocket 11 which is driven by drive means 23 in the form of a motor 14 connected by couplings 29 and 30 to reduction gear 26 having an output sprocket 25 coupled to the drive sprocket 11 by a chain 27. A tensioner 28 acts on the chain 27 to maintain a constant tension in the chain 27 and thereby maintain the precision with which the sprocket 11 is driven.

Figure 3:
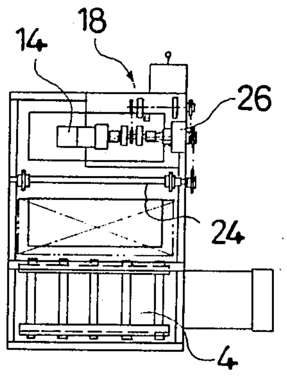
FIG. 3 is a top plan view of the FIG. 1 apparatus.
Figure 5:
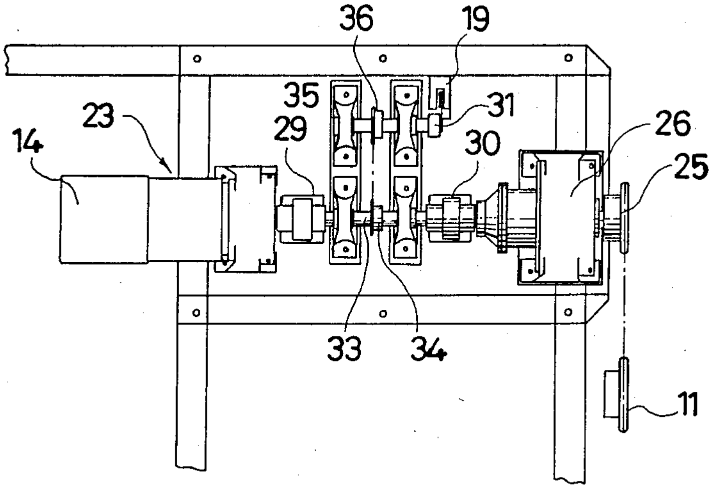
FIG. 5 is a top plan view of the drive arrangement shown in FIG. 4.

The rotation of the motor 14 is controlled by a feed control means 18 shown in FIGS. 3 and 5. Means 18 comprises an intermediate shaft 31 which extends parallel to a connecting shaft 33 between the couplings 29 and 30 and is rotated by the shaft 33 through a drive chain 35 engaged around a sprocket 34 on the shaft 33 and a sprocket 36 carried by the shaft 31. A proximity switch 19 is provided to count rotations of the intermediate shaft 31.

The chains 13, 13' support therebetween a series of lithographic plate trays 16 which are equally spaced apart along the length of the chains and which are so mounted on the chains that each tray 16 inclines upwardly away from the chain as it passes downwardly through the righthand part of the main housing 65 (as seen in FIG. 1) over that portion of the path of the chains 13, 13' which extends from the belt conveyor 4 to a dispensing outlet 20 below the belt conveyor.

A lithographic plate receiving box 21 is provided at the bottom of the housing 65 below the dispensing outlet 20 and a safety device actuated by a foot switch 22 extending from the bottom of the housing 65 is provided for stopping the rotary shelf device 10 in the event of a malfunction.

As shown in FIGS. 8 to 11, an inner upturned end of each plate tray 16 is reinforced against deflections due to inertia by upper and lower angle members 56 and 56' which are secured to the chains on the tray 16 by screws (not shown) engaged in tapped holes 57 formed in the upturned end of the plate 16. A pair of rubber cushions 58 are mounted at the inner end of the tray 16 in the channel formed between the reinforcing member 56 and the plate 16. Tapped fixing holes 59 are provided in the upturned end of the tray 16 for securing the cushions 58.

In use of the apparatus described above, the leading edge of a lithographic plate S carried by a clip 42 of the overhead conveyor 1 arrives at the chute 2 and comes into abutment with the extended stop 43 of the chute. The clip cam 41 is actuated by piston and cylinder device 40 to open the clip 42 so that the lithographic plate is released from the clip 42 as the clip continues its forward movement with the conveyor 1.

The released lithographic plate S slides down the upper chute 2 and is guided by the lower chute 2' onto the closed plate retainers 49, 49' until the leading edge of the plate comes into contact with the stop 48. The cylinder 50 is then actuated to move the lithographic retainers into the open position indicated by the dashed lines in FIG. 6 and the lithographic plates is dropped onto the belt conveyor 4.

Drive is applied to the belt conveyor by motor 52 to transport the lithographic plate onto an adjacent inclined plate tray 16 of the rotary shelf device 10, the plate sliding down the inner edge of the tray 16 with the cushion members 58 ensuring that the plate is not damaged. Thereafter, the motor 14 is actuated to rotate the sprocket 11 and drive the chains 13, 13' a distance equal to the spacing between adjacent trays 16, so as to position the next empty tray to receive the next lithographic plate from the belt conveyor 4. The proximity switch 19 of the control means 18 detects the rotation of the intermediate shaft and controls the operation of the motor 14 to achieve the desired stepwise movement of the chain 13. The control means also has a quick feed state which may be selected to advance the rotary shelf device continuously for a desired distance.

The lithographic plates S arriving at the chute 2 are thus placed on successive plate trays 16 of the device 10 and conveyed downwardly through the housing 65 to the plate outlet 20 where they can be removed from their respective trays. The empted plate trays continued their stepwise movement with the chains 13, 13' around the lower sprockets 12 and then upwardly through the left hand side of the main housing 65, returning eventually to a position adjacent the belt conveyor 4.

Any lithographic plates S which are not removed from the plate trays 16 at the outlet 20 automatically drops into the plate receiving box 21 at the base of the housing 65. The stepwise movement of the plate trays 16 may be arrested at any time by actuating the safety switch 22 at the lower end of the housing.

In the above described embodiment of the present invention, the upward inclination of the plate trays 16 stabilizes the position of the lithographic plates during their movement from the belt conveyor 4 to the outlet 20. The reinforcing angle members 56 and 56' preclude any deflection of the tray and thus prevent the surface of the lithographic plate from being damaged.

Storage of the lithographic plates is achieved simultaneously with the downward transport of the plates, thereby reducing the floor space and, since the lithographic plates are stored substantially horizontally, they are easily removed at the outlet 20.

The features disclosed in the foregoing description, in the following claims and/or in the accompanying drawings may, both separately and in any combination thereof, be material for realising the invention in diverse forms thereof.

We claim:

1. Apparatus for transporting lithographic plates from a first location at which the plates are delivered on edge by an overhead conveyor to a second location vertically below the first location, comprising:

input means at the first location for loading individual said lithographic plates, said input having a chute means defining a curved path for receiving the lithographic plates as oriented on edge and re-orienting the lithographic plates along the curved path for substantially horizontal placement; and, storage means for receiving the lithographic plates at the first location and delivering the lithographic plates in succession to the second location, the storage means having a rotary shelf conveyor in which a series of plate trays mounted on an endless loop and operable to bear the lithographic plates on their sides are moved around an endless path including a portion extending vertically between said first and second locations, and the plate trays being upwardly inclined from the endless loop during movement thereof along said portion of the path extending vertically between the first and second locations, the input means delivering the lithographic plates onto the plate trays at a substantially horizontal orientation, and the input means having a transfer conveyor for transferring the lithographic plates received from the chute means onto an adjacent tray of the rotary shelf conveyor.

2. Apparatus according to claim 1, wherein the input means further comprises plate retaining means receiving said lithographic plates from the chute means, the plate retaining means and the transfer conveyor being coordinated with the plate trays to hold and position the lithographic plates for deposit on one of the plate trays.

* * * * *